J. S. GODFREY.
Moldboard for Plow.

No. 105,446.　　　　　Patented July 19, 1870.

Witnesses:
R. C. Menshall
Thos. Kern

Inventor:
Joseph S. Godfrey,
by Bakewell & Christy
his Atty's.

UNITED STATES PATENT OFFICE.

JOSEPH S. GODFREY, OF LESLIE, MICHIGAN, ASSIGNOR TO HIMSELF AND SEARS M. LOVERIDGE, OF PITTSBURG, PENNSYLVANIA.

IMPROVEMENT IN PLOWS.

Specification forming part of Letters Patent No. 105,446, dated July 19, 1870.

*To all whom it may concern:*

Be it known that I, JOSEPH S. GODFREY, of Leslie, in the county of Ingham and State of Michigan, have invented a new and useful Improvement in Plows; and I do hereby declare the following to be a full, clear, and exact description thereof, reference being had to the accompanying drawings, making a part of this specification, in which—

Figure 1:
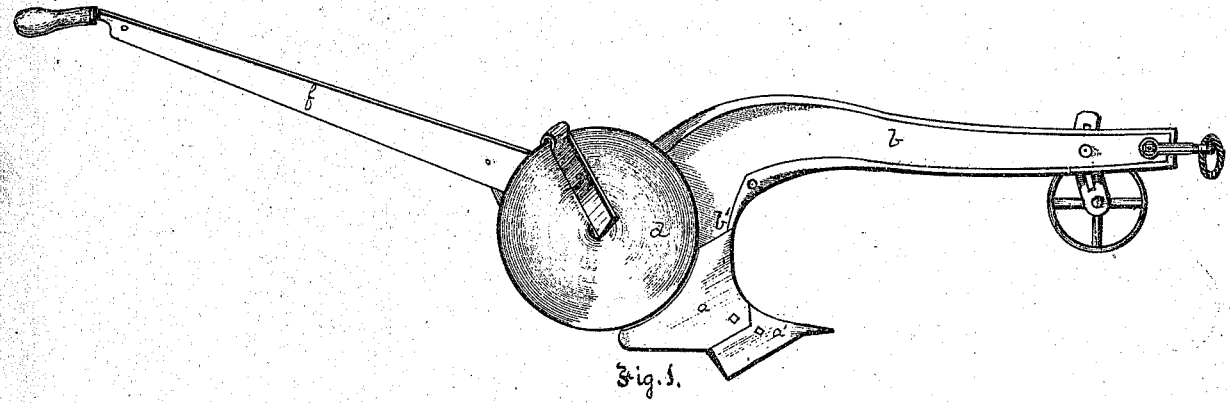
Figure 2:
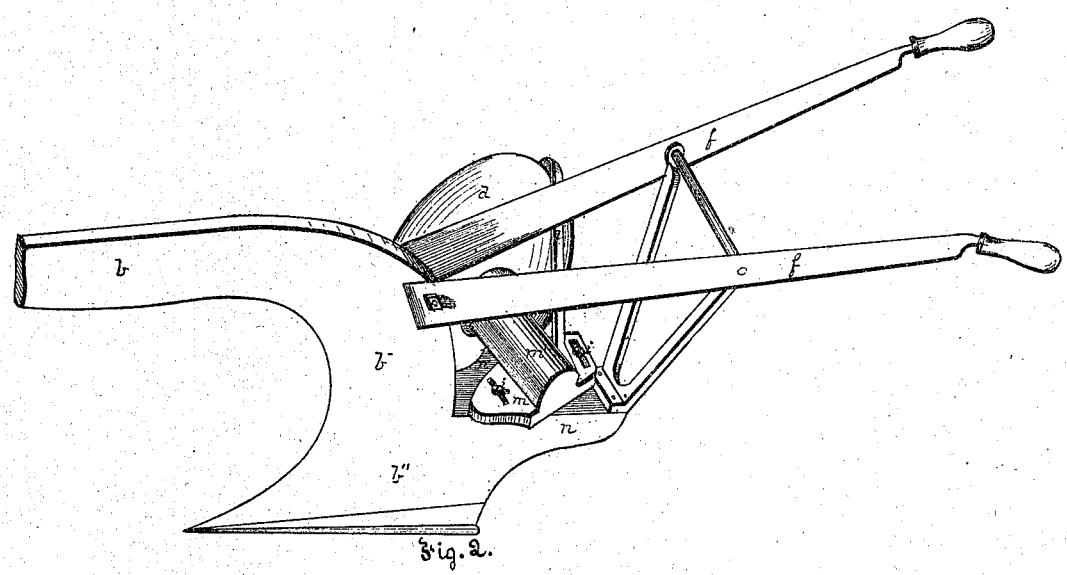

Figure 1 is a side elevation on the mold-board side of my improved revolving mold-board plow, and Fig. 2 is a perspective view of the opposite side.

Like letters of reference indicate like parts in each.

My invention relates to an improvement in revolving disk mold-board plows; and it consists in an improved arrangement of the revolving disk mold-board with reference to other operative parts of the plow, that the mold-board shall operate clear of the bottom of the furrow and be caused to revolve by the action of the furrow alone without the necessary use of gearing or other like device.

To enable others skilled in the art to make and use my invention, I will proceed to describe its construction and mode of operation.

As shown in the drawings, the beam $b$, standard $b'$, and landside $b''$ are cast in one piece.

The point $a'$ is of the usual or any known form, as also are the handles $f$. The shin-piece $a$ is made with a forward edge to fit neatly onto the rear edge of the point $a'$, and so that their working-faces at the joint of the two shall be flush with each other. The rear edge of the shin-piece $a$ is of circular form, the curvature of such rear edge corresponding nearly or exactly with the curvature of the periphery of the revolving mold-board $d$, so that, while they do not create frictional resistance by contact with each other, they afford as little resistance as possible to the earth as it passes from one to the other.

The rear end of the beam $b$ is made with an extension, $n$, and onto such extension, so as to form part thereof, I cast a horizontal flange, $n'$, of any desired size, though it need not be very large. On or against one face of this flange $n'$, I fasten by bolts and nuts $i$, or in other convenient way, a box-plate, $m$, which carries the box $m'$. The box-plate $m$ and box $m'$ may be cast in one piece, as shown, or separately, and be bolted together. The box $m'$ receives the shaft or axle of the mold-board $d$, and is made close all around, except at its forward end at an oiling-opening.

The revolving mold-board $d$ is made of a disk form, with an outer or operative face slightly concave or dish-shaped. It is made of cast-steel, or hammered iron or steel, or other metal or mixture of metals. It is hung by its axle in about the position of the ordinary mold-board and at any desired angle to the line of draft, though other modes of attaching it may be employed, as may be preferred.

It will be observed that the mold-board described is so adjusted with reference to the shin-piece $a$ that the furrow rising on the shin-piece strikes the mold-board on its lower forward quadrant, so that it is caused to revolve by the force of the mold from the furrow alone, and herein consists an important feature of difference between the plow described and other revolving mold-board plows previously invented. So far as I can ascertain no revolving mold-board previous to the date of my invention was ever made which was not caused to rotate either by its circumferential edge coming in contact with the bottom of the furrow or else by the use of a separate wheel which was attached to the landside of the plow, and which, by projections or teeth engaging the mold-board, caused it to revolve. I dispense with all such devices, partly because they are an additional expense, partly because they interfere with the successful operation of the mold-board, and partly because, if used, they render the proper adjustment of the mold-board impossible.

In order to keep the working-face of the mold-board clean, and also prevent the axle from leaving the box $m'$, I bolt or otherwise secure to the box-plate $m$ a scraper, $g$, which passes up over the edge of the mold-board and presents to the face of the latter a scraping-edge.

The devices described for attaching the mold-board to the plow are described and claimed in Letters Patent granted to Godfrey and Loveridge, March 29, 1870.

What I claim as my invention, and desire to secure by Letters Patent, is—

The arrangement, substantially as described, of a concave-faced revolving disk mold-board in connection with a plow, whereby it shall be caused to rotate by action of the mold from the furrow without coming in contact with the bottom of the furrow, and without the necessary use of other appliances to impart to it a rotary motion.

In testimony whereof I, the said JOSEPH S. GODFREY, have hereunto set my hand.

JOSEPH S. GODFREY.

Witnesses:
    JOHN GLENN,
    THOS. W. KERR.